Sept. 20, 1932. R. T. SVENDSEN ET AL Re. 18,605
PROPELLER MOUNTING
Original Filed June 6, 1927 2 Sheets-Sheet 1
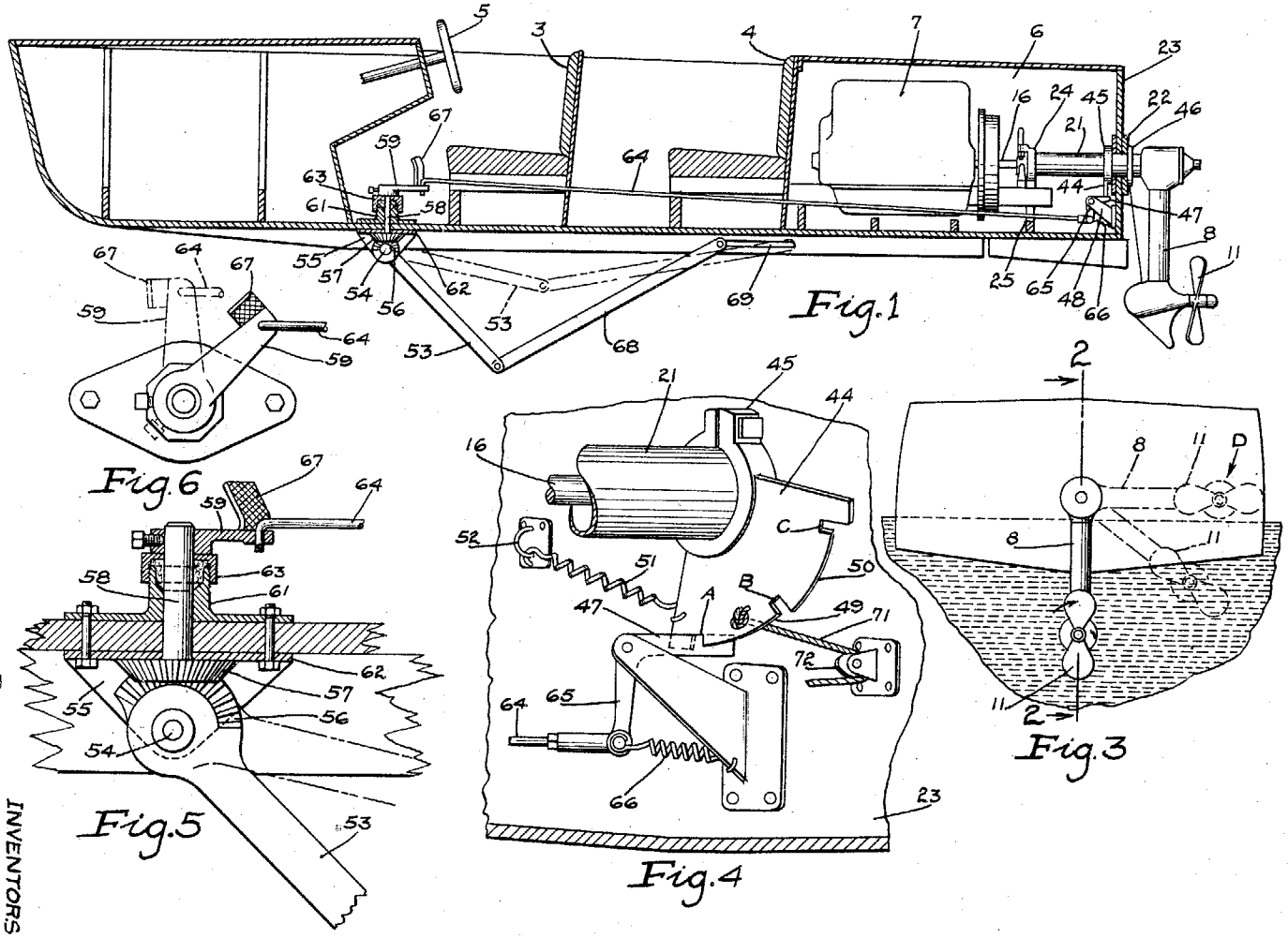
INVENTORS
ROBERT T. SVENDSEN
DAVID G. CHANDLER
By Paul, Paul & Moore
ATTORNEYS Sept. 20, 1932. R. T. SVENDSEN ET AL Re. 18,605
PROPELLER MOUNTING
Original Filed June 6, 1927 2 Sheets-Sheet 2
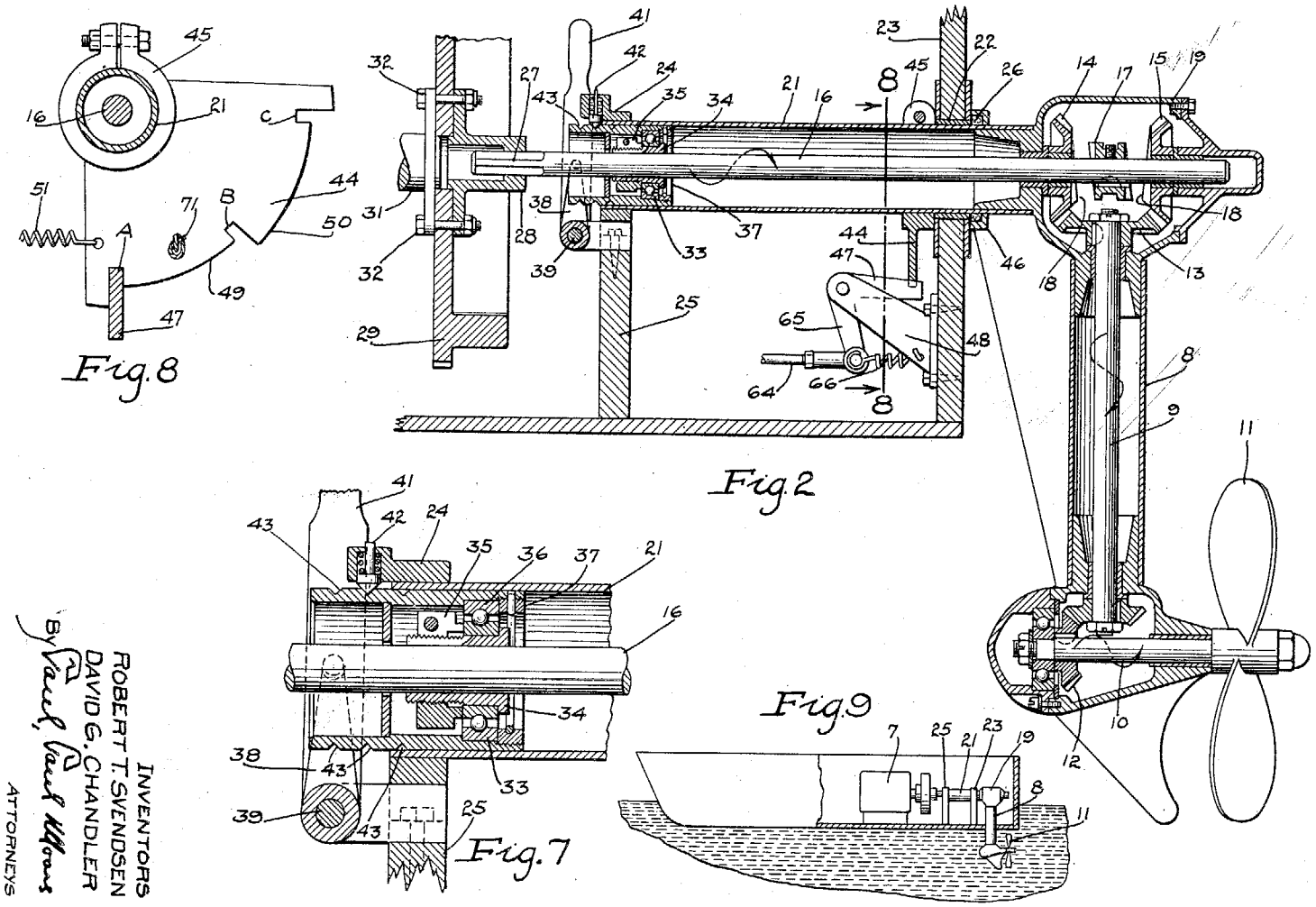
INVENTORS
ROBERT T. SVENDSEN
DAVID G. CHANDLER
By Paul, Paul & Woods
ATTORNEYS Reissued Sept. 20, 1932

Re. 18,605

UNITED STATES PATENT OFFICE

ROBERT T. SVENDSEN AND DAVID G. CHANDLER, OF MINNEAPOLIS, MINNESOTA, ASSIGNORS TO NEPTUNE ENGINEERING COMPANY, OF DOVER, DELAWARE, A CORPORATION OF DELAWARE

PROPELLER MOUNTING

Original No. 1,745,235, dated January 28, 1930, Serial No. 196,972, filed June 6, 1927. Application for reissue filed March 3, 1931. Serial No. 519,846.

This invention relates to new and useful improvements in propeller mountings and an object of the invention is to provide such a mounting comprising a swingable support for the propeller, mounted in such a manner that when released, the torque of the engine crank shaft will tend to adjust the propeller to a higher position in the water, or, in some instances, it may lift it entirely out of the water.

A further object of the invention is to provide a propeller mounting having a swingable support adapted to swing about the axis of the engine drive shaft, and means being provided for locking the support in its adjusted positions.

A further object is to provide an adjustable propeller mounting having means adapted normally to retain the propeller in an adjusted position beneath the surface of the water, and having a connection with a mechanism mounted in the boat which, when engaged by an obstruction in the water, will automatically release the propeller and permit it to be moved to a higher position to avoid striking such obstruction.

A further object is to provide a propeller mounting comprising a casing having a drive shaft mounted therein, the forward end of which is adapted to be operatively connected with a prime mover such as an engine, and a gear housing being provided on said casing having a tubular member secured thereto, at the lower end of which the propeller is mounted, and the propeller having a driving connection with the drive shaft through a reversing gear mechanism, whereby the rotation of the propeller may be controlled to propel the boat in either direction, and said tubular extension cooperating with said casing to provide a support for the propeller.

A further object is to provide a propeller mounting comprising a laterally swingable support for the propeller, having means engaged by a latch to retain the propeller in an adjusted position, and means being provided at the forward end of the boat for moving said latch out of engagement with said means to permit the propeller to be relatively adjusted with respect to the water level.

A further object is to provide a propeller mounting having means whereby the propeller may be effectively operated to propel the boat in any one of several adjusted positions. The apparatus is so designed that the torque of the engine shaft, assisted by the action of the propeller in the water, constantly tends to raise the propeller to a higher elevation when the latter is operating to move the boat forwardly. If desired, a spring or other auxiliary force may be provided to aid the torque of the engine shaft to thus lift the propeller to a higher elevation or entirely out of the water. The propeller is retained in adjusted position by a suitable locking means including a quadrant movable with the casing and adapted to cooperate with a suitable latch. This latch may be actuated either manually or automatically to release the locking member and permit the engine torque to relatively change the position of the propeller in the water. The periphery of the quadrant may be stepped and notched in such a manner that the propeller may move only a portion of its travel, depending upon the size or height of the obstacle encountered in the water by the latch-releasing member, positioned toward the forward end of the boat and depending into the water. The quadrant and latch are so constructed that the propeller is temporarily retained in a higher adjusted position, until the latch is again released from the locking member. The position of the latch-releasing member is governed by the position of the propeller in the water, because of its connection therewith, as for instance, when the propeller is in its lowermost position, the latch-releasing member will depend into the water below the bottom of the boat, and, when in its uppermost position, it will lie substantially parallel to the bottom of the boat.

A further object is to provide a propeller mounting comprising a substantially horizontally disposed drive shaft, having one end adapted for connection with a conventional type of engine, and including a swingable support having a propeller shaft mounted therein and connected with said drive shaft so as to cause the propeller to rotate in a direction opposite to the direction of rotation of the drive shaft, when the boat is moving forwardly, whereby the action of the propeller in the water will assist the torque of the drive shaft to raise the propeller to a higher elevation upon release of the swingable support.

A further object is to provide an apparatus of the class described having the propeller mounted in such a manner that it may be quickly adjusted to different levels to accommodate it to the depth of the water through which the vessel is cruising, and the supporting means for the propeller being so constructed that the maximum efficiency of the propeller is maintained in any of its adjusted positions.

The particular object of the invention therefore is to provide an improved propeller mounting.

Other objects of the invention will appear from the following description and accompanying drawings and will be pointed out in the annexed claims.

In the drawings, there has been disclosed a structure designed to carry out the various objects of the invention, but it is to be understood that the invention is not confined to the exact features shown as various changes may be made within the scope of the claims which follow.

In the drawings:

Figure 1 is a vertical sectional view of a boat or launch showing the invention applied thereto;

Figure 2 is an enlarged vertical sectional view on the line 2—2 of Figure 3;

Figure 3 is an end view of the boat, showing in full and dotted lines, different positions of the propeller;

Figure 4 is a detail view in perspective, showing the means for locking the propeller in its adjusted positions;

Figure 5 is a detail sectional view showing the means provided at the forward end of the boat for releasing the propeller when passing over an obstruction in the water;

Figure 6 is a plan view of Figure 5;

Figure 7 is an enlarged detail sectional view showing the general construction and arrangement of the bearing parts provided at the forward end of the cylindrical casing in which the drive shaft is mounted;

Figure 8 is a detail sectional view on the line 8—8 of Figure 2, with some of the parts omitted; and Figure 9 is a view illustrating a modified form.

In the selected embodiment of the invention here shown, for purposes of disclosure, there is illustrated in Figure 1, a longitudinal sectional view of a boat or launch provided with seats 3 and 4, the usual steering wheel 5, and the engine compartment 6, in which an engine 7 is mounted.

The novel propeller mounting featured in this invention is best shown in Figure 2, and comprises a tubular member 8 having a driven intermediate shaft 9 mounted therein to one end of which a propeller 11 is operatively connected, by means of a bevel gear drive 12 and a shaft 10. The upper end of the shaft 9 has a bevel gear 13 secured thereto, which constantly meshes with a pair of bevel pinions 14 and 15, loosely mounted upon a drive shaft 16, having a clutch member 17 non-rotatably secured thereto between said pinions. The bevel pinions 14 and 15 are provided with clutch teeth 18 adapted to be selectively engaged with the clutch member 17 to control the operation of the propeller 11. The pinions 14 and 15, gear 13 and clutch member 17 are mounted in a suitable housing 19, and provide a conventional forward-and-reverse drive for the propeller, the gear 14 being adapted to cooperate with the clutch member 17 to propel the boat forwardly, and the gear 15 cooperating therewith to reverse the direction of movement of the boat. Thus, when the boat is traveling forwardly, the propeller will rotate in the direction indicated by the arrow in Figures 2 and 3, or in a direction opposite to the direction of rotation of the drive shaft 16.

A housing 19 is secured to the upper end of the tubular member 8 and to a cylindrical casing 21. The rear end portion of the casing 21 is supported in a bearing 22 preferably provided in the rear wall 23 of the boat, and the forward end thereof is mounted in a bearing 24, secured to a support 25 suitably secured to the side wall and bottom of the boat. A suitable packing 26 is provided to prevent leakage of water through the bearing 22. The drive shaft 16 has a squared end 27 slidably engaged with the hub 28 of the engine fly wheel 29 which, as shown, is secured to the engine crank shaft 31 by such means as bolts 32.

Referring to Figure 2, it will be noted that the drive shaft 16 is slidably mounted in the casing 21. The forward end of this shaft may be supported in an anti-friction bearing 33, having its inner ball race suitably secured to the shaft by means of a split sleeve 34 and clamping ring 35. The outer ball race of the bearing 33 is secured to a relatively larger sleeve 36 by means of a lock ring 37.

The sleeve 36 extends beyond the casing 21 and is engaged by a forked arm 38 mounted upon a shaft 39, having a shift lever 41 terminally secured thereto, whereby the sleeve 36 and shaft 16, may be axially moved within the casing 21 to move the clutch into and out of driving connection with the pinions 14 and 15. A spring-actuated locking bolt 42, of ordinary construction, is provided to lock the sleeve 36 in its adjusted positions. Preferably, three notches or grooves 43 are provided in the sleeve, one adapted to retain the clutch member 17 in driving connection with the pinion 14, as when operating the boat forwardly, one for retaining it in driving connection with the pinion 15 when traveling backwards, and the central notch functioning to retain the clutch member in neutral position. (See Figures 2 and 7.) By thus slidably mounting the drive shaft 16 in the casing 21 the operation of the propeller may be controlled at will by the simple manipulation of the shift lever 41.

Means are provided for locking the propeller in its adjusted positions, and is shown comprising a quadrant 44 having a split hub 45 whereby it may be securely clamped to the casing 21. The hub of this quadrant cooperates with the flange 46 to prevent longitudinal movement of the casing 21 in the bearings 22 and 24. A latch member 47 is pivotally mounted upon a bracket 48, secured to the rear wall 23 of the boat, and is adapted to engage one of a plurality of notches A, B, and C provided in the quadrant 44, as shown in Figure 8. A tension spring 51 is provided to assist in raising the propeller, when the boat is being operated at comparatively slow speeds. This spring has one end secured to the quadrant 44 and its other end to an eye 52, secured to the rear wall 23 of the boat, and cooperates with the torque of the drive shaft 16, when the latter is operating, to swing or adjust the propeller to a higher elevation, as shown in dotted lines in Figure 3. At higher speeds the torque of the drive shaft 16 can raise the propeller without the assistance of the spring 51.

In Figure 4, the quadrant and latch are shown in the positions assumed when the propeller is in its lowermost position, shown in Figures 1, 2, and 3. The quadrant 44 is preferably constructed as shown in Figure 8. Referring to this figure, it will be noted that its periphery is stepped, that is, the peripheral faces 49 and 50, between the notches, are of different heights, with respect to the axis of the quadrant. Thus when the latch 47 is moved out of the notch A, either automatically or manually, the torque of the drive shaft 16, aided by the spring 51 and the action of the propeller in the water, will cause the quadrant to be rotated until the latch engages the high wall of the notch B. The movement of the quadrant will then be interrupted, and the propeller will be locked in the intermediate position shown in dotted lines in Figure 3. Should the latch, however, be lifted high enough to permit the peripheral face 50 to pass beneath it, then the propeller will move or swing to a higher elevation, as also shown at D in Figure 3.

A propeller-releasing member 53 is pivotally mounted at the forward end of the boat and normally depends into the water to the full line position shown in Figure 1. The upper end of this member is supported upon a stud 54, pivotally mounted in a bracket 55. A gear segment 56 is secured to the stud and meshes with a pinion 57, terminally provided upon a vertically disposed stub shaft 58 having an arm 59 secured to the upper end thereof. The stub shaft 58 is supported in suitable bearings 61 and 62, the former having a stuffing box 63 for preventing leakage of water through the bearings and into the boat. A rod 64 connects the arm 59 with a depending arm 65 integrally formed with the latch member 47.

Thus, it will be noted that when the actuating member 53 is engaged by an obstruction in the water, it may be moved to the dotted line position shown in Figure 1, thereby actuating the arm 59 to move the latch 47 out of engagement with the quadrant 44. When the latch has thus been moved out of engagement with the quadrant, the propeller may be moved to one of its adjusted positions, shown in dotted lines in Figure 3. A tension spring 66 connects the arm 65 with the bracket 48 and acts to return the latch member 47 to its normal operative position, in engagement with one of the notches in the quadrant, in which position the actuating member 53 will be returned to its normal full line position, shown in Figure 1.

The arm 59, secured to the stub shaft 58, is preferably provided with a foot piece 67, whereby the propeller may be manually released by the operator, when desired. A guide bar 68 has one end pivotally connected to the actuating member 53 and its other end slidably mounted in a slot 69, preferably provided on the keel of the boat, as shown in Figure 1. This guide bar 68 limits the downward movement of the member 53 and also prevents the latter from becoming damaged when the boat is moving backwardly, should the member accidentally engage an obstruction in the water or strike the bottom.

A cable 71 has one end secured to the quadrant 44 and passes over a pulley or sleeve 72, as shown in Figure 4. The other end of this cable preferably extends forwardly to a convenient position adjacent to the operator's seat 3 to provide means whereby the propeller may be manually returned to its operative position in the water, during the operation of the engine.

As a result of the novel propeller supporting and operating mechanism herein disclosed, the propeller may readily and quickly be moved from a lower to a higher position to avoid striking an obstruction in the water. The latch-actuating member or bar 53, at the forward end of the boat provides means for automatically releasing the propeller to permit it to be moved to a higher level, in the event that an obstruction is encountered. The adjustment upwardly of the propeller is controlled by the height or size of the obstruction encountered in the water by the bar 53. It has also been found that by mounting the propeller as shown in Figure 2, and as set forth in this application, that the driving torque of the engine crank shaft, transmitted to the drive shaft 16, when the propeller is functioning, and assisted by the action of the propeller in the water when traveling forwardly, is substantially sufficient to move the propeller from its lowermost to its uppermost position, when the latch member 47 is fully released, thus dispensing with the use of other means for thus adjusting the position of the propeller. The center notch B in the quadrant 44 provides means whereby the propeller may be retained in the intermediate position shown in dotted lines in Figure 3, thereby permitting the boat to be propelled through very shallow water with the propeller operating at practically full efficiency. It will also be noted that the axis of the propeller shaft 10 is maintained substantially parallel to the axis of the drive shaft 16, regardless of its position.

When the clutch member 17 is disengaged from the gears 14 and 15, the propeller may be manually adjusted by means of the foot pedal 67 and the flexible cord or cable 71. The speed ratio between the shafts 9 and 16 may also be varied to suit conditions, by simply substituting smaller or larger gears in place of the gears 13, 14, and 15. The general construction of the apparatus, as a whole, is also such that it may be assembled as a unit, as shown in Figure 2.

Figure 9 illustrates a modified form wherein the propeller support is rigidly mounted in the boat, and the tubular member 8 extends downwardly through the bottom of the boat.

We claim as our invention:

1. In a propeller mounting, the combination of a revoluble support, a drive shaft mounted to rotate therein, a driven shaft connected with the drive shaft and mounted to swing about the axis of said drive shaft, a propeller having a geared connection with said driven shaft, a lock for retaining the propeller in adjusted positions, said lock comprising a latch and quadrant, and means for releasing said lock to permit said support to swing to relatively adjust the position of the propeller in the water.

2. In a propeller mounting, the combination of a revoluble support, a drive shaft mounted to rotate therein, an engine connected with said drive shaft, a driven shaft connected with said drive shaft and mounted to swing about the axis of said drive shaft, a propeller operatively connected to said driven shaft, locking means for retaining the propeller in adjusted positions beneath said drive shaft, means positioned to be engaged by an obstruction in the water to automatically release said locking means, and the connections between said engine and said propeller being adapted to automatically raise the propeller in the water through the torque of the engine, when said locking means is released.

3. In a propeller mounting, the combination of a revoluble support, a drive shaft mounted to rotate therein, a driven shaft, a clutch mechanism for operatively connecting the driven shaft with said drive shaft, a hollow support for the driven shaft mounted to swing about the axis of said drive shaft, a propeller operatively connected to the swingable end of said driven shaft and carried by said hollow support, locking means for retaining the propeller in adjusted positions, and means positioned to be engaged by an obstruction in the water and to automatically release said locking means to permit the torque of the engine to relatively adjust the position of said propeller in the water.

4. In a propeller mounting, the combination of a revoluble support, a drive shaft mounted therein and adapted for longitudinal movement, a clutch member secured to one end of said drive shaft and the other end thereof having a slidable driving connection with a power device, pinions loosely mounted upon said drive shaft at opposite sides of the clutch member, a tubular member secured to said support and arranged at right angles with respect thereto, a driven shaft mounted in said tubular member and having a geared connection with said pinions, a propeller operatively connected with said driven shaft and mounted to swing about the axis of said drive shaft, and means for axially translating said drive shaft to selectively move said clutch member into and out of driving connection with said pinions to control the operation of the propeller.

5. In a propeller mounting, the combination of a horizontally disposed revoluble support, a drive shaft therein, a propeller operatively connected with the drive shaft and adapted to swing about the axis thereof, means associated with said support and tending normally to move the propeller to an ineffective position above the surface of the water, a lock for securing the propeller in adjusted positions, and a lock-releasing member mounted remote from the propeller and adapted to be actuated by an obstruction in the water to automatically release said lock to permit said means to relatively adjust the position of the propeller with respect to the water level.

6. In a propeller mounting, the combination of a revoluble support, a drive shaft therein, a propeller operatively connected with the drive shaft and adapted to swing about the axis thereof, the axis of said propeller being arranged substantially in parallel relation to the axis of the drive shaft, a lock for securing the propeller in adjusted positions, and a lock-releasing member mounted remote from the propeller and depending below the bottom of the boat and adapted to be actuated by an obstruction to automatically release said lock to permit relative adjustment of the propeller with respect to the water level.

7. In a propeller mounting, the combination of a revoluble support, a drive shaft therein having means for connecting it with an engine crank shaft, a tubular member secured to said support and having a driven shaft therein, a propeller connected with said driven shaft, a notched quadrant secured to said revoluble support and movable therewith, a latch member adapted to lockingly engage said quadrant, and a pivotally mounted member having a connection with said latch and normally depending below the bottom of the boat in position to engage an obstruction in the water, whereby said member may be operated to automatically release the latch to permit the propeller to be relatively adjusted with respect to the water level.

8. In a propeller mounting, the combination of a revoluble support, a drive shaft mounted therein and having means for connecting it with an engine crank shaft, a tubular member secured to said support and having a driven shaft therein, one end of which is adapted for connection with said drive shaft, a propeller operatively connected with the opposite end of the driven shaft, a notched quadrant secured to said revoluble support, a latch member adapted to lockingly engage said quadrant and functioning to retain the propeller in its adjusted positions, a latch-actuating member pivotally connected to the bottom of the boat adjacent to the forward end thereof, an arm having a geared connection with said member, means connecting said arm with said latch member, and said latch-actuating member normally depending below the bottom of the boat in position to engage an obstruction in the water, whereby the member will be actuated to operate said arm and to release said propeller to permit it to be moved to an ineffective position above the water level.

9. In a propeller mounting, the combination of a movable support comprising a cylindrical casing having a lateral extension, bearings for the casing, a propeller terminally mounted on said extension and having its axis spaced from the axis of said casing and arranged substantially parallel thereto, power transmission means in the casing and extension for operatively connecting the propeller to a power device, a lock for securing the support in adjusted positions, said lock comprising a sector secured to the casing, a plurality of notches in the periphery of the sector, a latch engageable with said notches to lock the sector against movement, tension means connected with said sector and tending normally to operate said support to move the propeller to a position out of the water, means also connected with the sector for moving the propeller into the water, and means operable to release said latch to permit said tension means to adjust the propeller to a higher position in the water.

10. In a propeller mounting, the combination of a movable support comprising a cylindrical casing having a lateral extension at one end, bearings for the casing, a propeller terminally mounted on said extension and having its axis spaced from the axis of said casing and arranged substantially parallel thereto, power transmission means in the casing and extension for operatively connecting the propeller to a power device, a lock for securing the support in adjusted positions, said lock comprising a sector secured to the casing, a plurality of notches in the periphery of the sector, a latch engageable with said notches to lock the sector against movement, tension means connected with said sector and tending normally to operate said support to move the propeller to a position out of the water, means also connected with the sector for manually moving the propeller into the water, and means adapted normally to depend into the water beneath the bottom of the boat and positioned to be engaged by an obstruction to automatically release said latch to permit said support to be operated to relatively adjust the position of the propeller in the water.

11. In a propeller mounting, the combination of a supporting member comprising a revoluble casing, a drive shaft mounted therein and having means for connecting it with an engine, a housing terminally provided on said casing, a hollow supporting member secured at one end to said housing and disposed at right angles to the drive shaft, said member being mounted to swing about the axis of the drive shaft, a driven shaft in said supporting member, a clutch-and-gear mechanism mounted in said housing for operatively connecting together said shafts, a propeller mounted at the opposite end of said supporting member and having an operative connection with said driven shaft, a notched quadrant secured to said casing, a latch engageable with the quadrant to lock the casing against movement, and means manually operable to actuate said latch to permit said hollow supporting member to be manually oscillated to relatively adjust the position of the propeller.

12. In a propeller mounting, the combination of a horizontally disposed movable cylindrical casing, bearings therefor, a drive shaft in the casing, a tubular support secured to the casing and normally depending therefrom, a driven shaft in said support, gears operatively connecting together said shafts, a propeller mounted at the swinging end of said support and having a geared connection with said driven shaft, a quadrant secured to said casing, adjacent one of said bearings and having a plurality of spaced notches in the periphery thereof, a latch engageable with said notches to lock the casing in adjusted positions, a latch-releasing member connected with said latch and adapted to be positioned to be engaged by an obstruction in the water to automatically release said latch to permit the casing to be rotated, the peripheral faces between the notches in said quadrant being arranged in steps whereby, when said latch-releasing member is actuated to adjust the position of the propeller, and the latch engages one of said notches, said member will be temporarily retained in such position, and means for manually releasing said latch to permit the propeller and said latch-releasing member to return to their normal positions.

13. In a propeller mounting, the combination of a revoluble casing, a drive shaft mounted therein, a propeller operatively connected with said drive shaft and having its axis spaced from the axis of said shaft and arranged in parallel relation thereto, a notched quadrant secured to the casing, a tension member having one end connected with the quadrant and its opposite end connected with a fixed support and tending normally to rotate said casing to move the propeller out of the water, a latch engageable with said quadrant to retain it in adjusted positions, a latch-actuating member mounted remote from the latch and normally depending into the water and adapted to be engaged by an obstruction to automatically release said latch to permit the tension member to automatically adjust the propeller to a higher elevation in the water, and manually operable means also provided for releasing said latch whereby the latch may be moved into unlocking position either automatically or manually.

14. In a propeller mounting, the combination of a revoluble support comprising a cylindrical casing, a drive shaft mounted therein, a propeller operatively connected with said drive shaft and having its axis spaced from the axis of said shaft, a notched quadrant secured to the casing, a tension member having one end connected with the quadrant and its opposite end connected with a fixed support and tending normally to rotate said casing to move the propeller out of the water, a latch engageable with said quadrant to retain it in an adjusted position, a manually operable latch-actuating member mounted remote from the latch, and means also connected with said quadrant for reversing its movement to lower the propeller into the water, whereby the adjustment of the propeller in either direction, may be manually controlled.

15. In a propeller mounting, the combination of a cylindrical casing, a drive shaft slidably mounted therein and having one end adapted for connection with a prime mover, a gear housing provided at one end of the casing and having a hollow supporting member depending therefrom, a clutch member secured to the drive shaft and located within said gear housing, a driven shaft in said supporting member, a propeller shaft terminally mounted in said supporting member and having a geared connection with said driven shaft, clutch gears loosely mounted upon said drive shaft within said gear housing and constantly meshing with a pinion secured to the upper end of said driven shaft, and said drive shaft being movable longitudinally to move said clutch member into and out of driving connection with said clutch to control the rotation of the propeller.

16. In a propeller mounting, the combination of a casing having a gear housing terminally provided at one end thereof, a drive shaft mounted to slide in said casing and having one end adapted for connection with a prime mover for constant rotation therewith, a clutch member secured to said drive shaft, a depending extension on said gear housing, a driven shaft mounted therein and having a gear terminally secured thereto, pinions loosely mounted upon said drive shaft, and constantly meshing with said gear, each pinion being provided with clutch teeth adapted to be engaged by said clutch member to control the operation of said driven shaft, a propeller shaft mounted at the lower end of said extension, and gears operatively connecting the propeller shaft to said driven shaft.

17. In a propeller mounting, the combination of a hollow casing having a gear housing terminally provided at one end thereof, a drive shaft mounted to slide in said casing and having one end adapted for connection with a prime mover for constant rotation therewith, a clutch member secured to said drive shaft, a depending extension on said gear housing, a driven shaft mounted therein and having a gear terminally secured thereto, pinions loosely mounted upon said drive shaft and constantly meshing with said gear, each pinion being provided with clutch teeth adapted to be engaged by said clutch member, a control lever at the opposite end of the casing for translating said drive shaft to selectively move said clutch member into and out of driving connection with said clutch pinions to control the operation of said driven shaft, a propeller shaft mounted at the lower end of said extensions and having its axis arranged substantially parallel to the axis of said drive shaft, gears for operatively connecting the propeller shaft with said driven shaft, and said hollow casing, gear housing, extension and shafts being adapted to be assembled as a unit.

18. The combination with an engine and a drive shaft, of a propeller mounting having a propeller journaled therein, means operatively connecting said drive shaft and mounting and adapted to raise said propeller through the torque of said engine, means for locking said propeller mounting in an operative position, and a device for automatically tripping said locking means to release said mounting.

19. In a propeller mounting, the combination of a revoluble support having a drive shaft mounted therein, an engine connected with said drive shaft, a tubular member secured to said revoluble support and having a propeller journaled in the swingable end thereof, a driven shaft mounted in said tubular member, means connecting said driven shaft with said drive shaft and adapted to laterally swing the propeller through the torque of said engine to adjust it to a higher elevation in the water, means for locking said tubular member and said propeller in operative positions, and a device for automatically tripping said locking means to release said mounting.

20. In combination, a boat having a drive shaft and a support therefor, a mounting connected with said support and adapted to swing about the axis of said drive shaft, a propeller supported in said mounting, means for securing said mounting in an operative position, a driving connection between said drive shaft and propeller adapted to rotate the propeller in a direction opposite to the direction of rotation of said drive shaft, when the boat is moving forwardly, and a device for releasing said mounting from said securing means whereby the torque of said drive shaft may adjust the propeller to a higher elevation in the water, said releasing device including a member mounted forwardly of and below the line of travel of said propeller, whereby an obstruction in the water may actuate said member to cause it to automatically effect the release of said mounting and propeller.

21. In a propeller mounting, the combination of a movable support comprising a casing provided with an extension disposed substantially in right angular relation thereto, a propeller terminally mounted on said extension and having its axis spaced from the axis of said casing, power transmission means in said casing and said extension for operatively connecting the propeller to a power device, a lock comprising cooperating members adapted to secure the support in adjusted positions, means operatively connected with said support and tending normally to operate it and thereby move the propeller to a higher elevation, means also connected with the casing for moving the propeller to a lower elevation, and means operable to release said lock to permit said first mentioned means to move the propeller to a higher elevation.

22. In a propeller mounting, the combination of a revoluble support comprising a casing, a drive shaft therein, a propeller operatively connected with said drive shaft and having its axis spaced from the axis of said shaft, a locking device for the support including a latch and a cooperating member, a device operatively connected with said revoluble support and tending normally to rotate it to move the propeller to a higher elevation, means for actuating said locking device to cause the release of said revoluble support, and means also operatively connected with said support whereby it may be manually moved in a direction to lower the propeller, and whereby the adjustment of the propeller in either direction may be manually controlled.

23. The combination with a boat, of a propeller mounting comprising an outboard transmission unit having a substantially vertically disposed driven shaft, a propeller connected with said driven shaft, a pivotal suspension for said unit, power means operatively connected with said unit and adapted to move the propeller to a higher elevation, and means also connected with the unit for moving the propeller to a lower elevation.

24. In a boat propulsion system, an engine, a substantially vertical tiltable outboard transmission housing, a propeller positioned at the lower end of the housing and operatively connected with the engine, power means for raising the housing and propeller to a higher elevation, when the propeller is in the water as well as when it is out of the water, and means for lowering the housing and propeller.

25. In a boat propulsion system, a substantially horizontal casing enclosing a drive shaft, an engine for driving said shaft, a hub on one end of said casing, a substantially right angle support attached to said hub and carrying a propeller, means for operatively connecting said propeller to the drive shaft, and means in said hub for reversing the direction of rotation of the propeller.

26. In a boat propulsion system, a substantially horizontal casing enclosing a drive shaft, an engine for driving said shaft, a hub on one end of said casing having a depending portion carrying a propeller, means for operatively connecting said propeller to the drive shaft, and means in said hub for disengaging the propeller from said shaft.

27. In a boat propulsion system, a substantially horizontal casing, a drive shaft therein, an engine provided with means for connecting it to one end of said drive shaft, a transmission mechanism connected to the opposite end of said shaft and having a member depending therefrom and carrying a propeller, and means on said transmission whereby the boat may be propelled in either a forward or reverse direction, and also whereby the propeller may be retained in a neutral position.

28. The combination with a boat, of an engine mounted therein, a substantially horizontally disposed drive shaft extending from the motor through the hull, a tiltable outboard transmission unit carrying the propeller, a pivotal suspension for said unit, a releasable connection between the drive shaft and said unit, and means by which the propeller will raise when the boat passes over an obstruction in the path of the propeller, while moving forwardly.

29. In combination with a boat, an engine mounted therein, a propeller unit including a normally vertical depending housing for the propeller, a substantially horizontally disposed shaft connecting the engine with the propeller unit; means for mounting the propeller unit for automatic tilting when the boat passes over an obstruction in the path of the propeller while the boat is moving forwardly, and means capable of holding the housing in substantially its lowered position, when the propeller is operated to move the boat rearwardly.

In witness whereof, we have hereunto set our hands this 28th day of February, 1931.

ROBERT T. SVENDSEN.
DAVID G. CHANDLER.